(12) United States Patent
Johnson et al.

(10) Patent No.: US 9,595,011 B2
(45) Date of Patent: Mar. 14, 2017

(54) SYSTEM AND METHOD FOR REAL-TIME SWEEPSTAKES PROMOTIONS TIED TO LIVE EVENTS

(71) Applicant: TLS Holdings, Inc., Gardnerville, NV (US)

(72) Inventors: Greg Johnson, Gardnerville, NV (US); Miles Johnson, Minden, NV (US); Paul Fallert, Seattle, WA (US); Phil Worack, Centennial, CO (US)

(73) Assignee: TLS HOLDINGS, INC., Gardnerville, NV (US)

( * ) Notice: Subject to any disclaimer, the term of this patent is extended or adjusted under 35 U.S.C. 154(b) by 251 days.

(21) Appl. No.: 14/275,796

(22) Filed: May 12, 2014

(65) Prior Publication Data

US 2015/0325081 A1     Nov. 12, 2015

(51) Int. Cl.
G06Q 10/02     (2012.01)
G07F 17/32     (2006.01)
G06Q 30/02     (2012.01)

(52) U.S. Cl.
CPC .............. *G06Q 10/02* (2013.01); *G06Q 30/02* (2013.01); *G07F 17/32* (2013.01); *G07F 17/3244* (2013.01); *G07F 17/3288* (2013.01)

(58) Field of Classification Search
CPC .... G06Q 30/08; G06Q 30/02; G06Q 30/0269; G06Q 30/0252; G06Q 30/0275; G06Q 30/0251
See application file for complete search history.

(56) References Cited

U.S. PATENT DOCUMENTS

| | | | |
|---|---|---|---|
| 2003/0157976 A1* | 8/2003 | Simon | G06Q 50/34 463/1 |
| 2008/0139306 A1* | 6/2008 | Lutnick | G06Q 30/02 463/30 |
| 2009/0197674 A1* | 8/2009 | Parham | G07C 15/006 463/25 |
| 2013/0222597 A1* | 8/2013 | Brink | G06Q 30/0211 348/157 |

* cited by examiner

*Primary Examiner* — Lawrence Galka
(74) *Attorney, Agent, or Firm* — Rimon, P.C.; Ronald Stern

(57) ABSTRACT

A real-time sweepstakes promotion system includes an event module having one or more data structures configured to receive real-time event data of at least one live event. A dashboard is communicatively coupled to the event module and configured to release an event action during the at least one live event. An incentive module is configured to identify occurrence of the event action within a defined time interval of the at least one live event and award a giveaway in response to the identified occurrence of the event action.

40 Claims, 8 Drawing Sheets

FIG. 2

| DASHBOARD *The Winning Seat* | 211 Giveaways Diplayed on device (sec) | 212 Giveaways Displayed per Min | 213 Giveaways Displayed per Hour | 214 Giveaways Released Simultaneously | 215 Giveaways displayed / hour | 216 Elapsed Game Time | 219 Total Impressions | 217 # of times giveaways viewed / user | 218 # of times giveaways viewed / user / hour |
|---|---|---|---|---|---|---|---|---|---|
| | | | | | Game: Dodgers/Yankees Saturday March 5th 3:30 PST - CNBC | | | | |
| Registered Users Signed into "Seat" | 25,000 | | | | | | | | |
| Live Screen Impressions | 5 | 10,800 | 648 | 425 | 275,400 | 3.25 | 895,050 | 35.80 | 11.02 |
| Results Screen Impressions | | | | | | | 895,050 | | |
| Game Over Impressions | | | | | | | 12,500 | | |
| Wallet Count | | | | | | | 12,500 | | |

Dodgers

| | 1 | 2 | 3 | 4 | 5 | 6 | 7 | 8 | |
|---|---|---|---|---|---|---|---|---|---|
| Start | Running | Running | Running | Running | Running | Running | Running | Start | |
| Pause | Pause | Pause | Pause | Pause | Pause | Pause | Pause | | |
| Stop | Stop | Stop | Stop | Stop | Stop | Stop | Stop | | |
| Action | Strikeout | Single | Single | Double | Double | Triple | Home Run | Grand Slam | |
| Who | Hiroki Kuroda | Hanley Ramirez | Yasiel Puig | David Adams | Any Player | Chris Capuano | Andre Ethier | Any Player | |
| Giveaway | BobbleHead | $5 Starbucks Gift | $10 Adidas Gift Cert | Logo T-Shirt | $25 Adidas Gift Cert | $100 Nike Gift Cert | Dodgers Fitted Cap | $1,000 | |
| Available Giveaways | 200 | 150 | 100 | 200 | 100 | 20 | 80 | 1 | |
| Number of Realease Simultaneously | 100 | 75 | 50 | 100 | 50 | 10 | 40 | 1 | |
| Seconds Displayed on Mobile Device | 5 | 5 | 5 | 5 | 5 | 5 | 5 | 5 | |
| Interval (seconds) | 1 | 1 | 1 | 1 | 1 | 1 | 1 | 520 | |
| Maximum Total Cost | $200 | $750 | $1,000 | $1,800 | $2,500 | $2,000 | $960 | $1,000 | |
| Cost per each Item | $1.00 | $5 | $10 | $9 | $25 | $100 | $12 | $1,000 | |

Yankees

| | 9 | 10 | 11 | 12 | 13 | 14 | 15 | 16 | |
|---|---|---|---|---|---|---|---|---|---|
| Start | Start | Start | Start | Start | Start | Start | Start | Start | |
| Pause | Pause | Pause | Pause | Pause | Pause | Pause | Pause | | |
| Stop | Stop | Stop | Stop | Stop | Stop | Stop | Stop | | |
| Action | Strikeout | Single | Single | Double | Double | Triple | Home Run | Grand Slam | |
| Who | Hiroki Kuroda | Hanley Ramirez | Yasiel Puig | David Adams | Any Player | Chris Capuano | Andre Ethier | Any Player | |
| Giveaway | BobbleHead | $5 Starbucks Gift | $10 Adidas Gift Cert | Logo T-Shirt | $25 Adidas Gift Cert | $100 Nike Gift Cert | Dodgers Fitted Cap | $1,000 | |
| Available Giveaways | 200 | 150 | 100 | 200 | 100 | 20 | 80 | 1 | |
| Number of Realease Simultaneously | 100 | 75 | 50 | 100 | 50 | 10 | 40 | 1 | |
| Seconds Displayed on Mobile Device | 5 | 5 | 5 | 5 | 5 | 5 | 5 | 5 | |
| Interval (seconds) | 1 | 1 | 1 | 1 | 1 | 1 | 1 | 520 | |
| Maximum Total Cost | $200 | $750 | $1,000 | $1,800 | $2,500 | $2,000 | $960 | $1,000 | |
| Cost per each Item | $1.00 | $5 | $10 | $9 | $25 | $100 | $12 | $1,000 | |

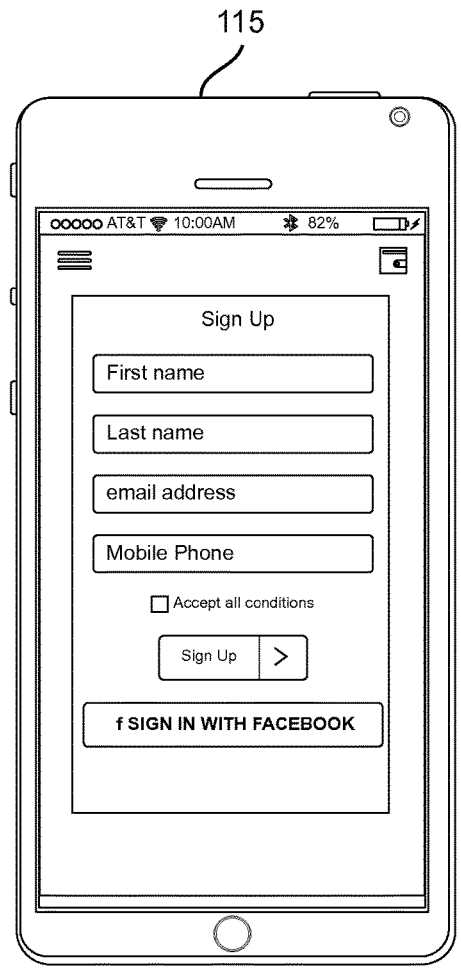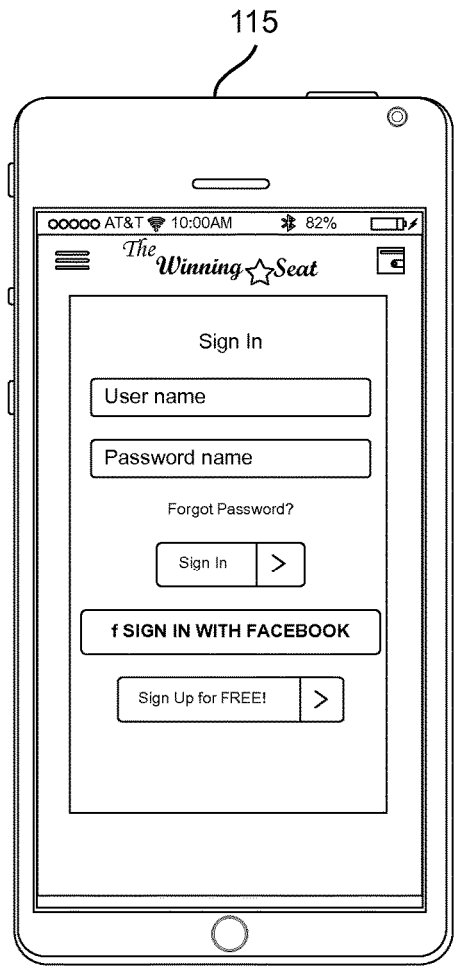
FIG. 4A                    FIG. 4B

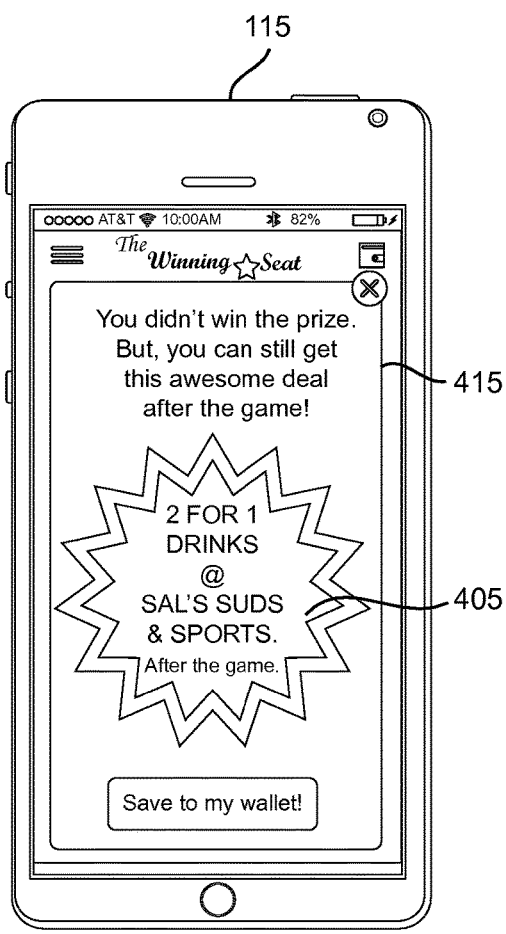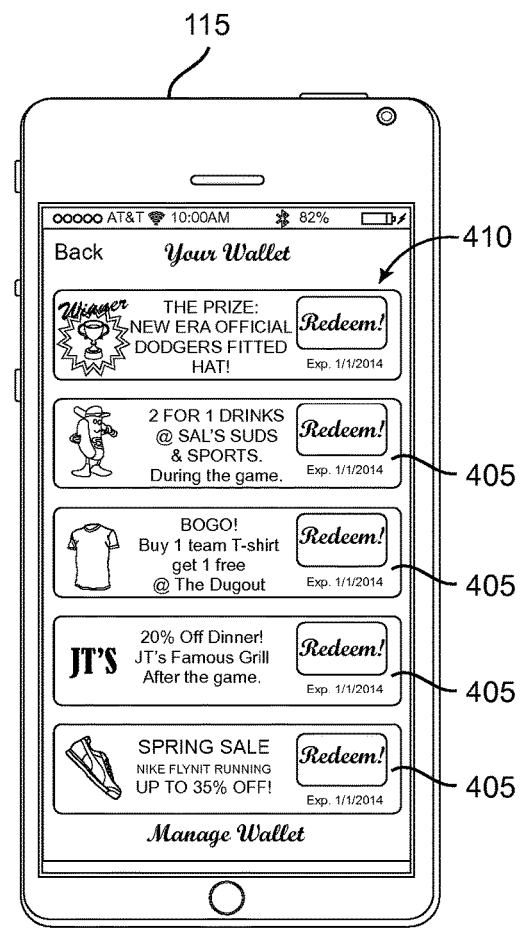
FIG. 4G
FIG. 4H

SYSTEM AND METHOD FOR REAL-TIME SWEEPSTAKES PROMOTIONS TIED TO LIVE EVENTS

SUMMARY

According to one aspect, a system includes an event module comprising one or more data structures configured to receive real-time event data of at least one live event; a dashboard communicatively coupled to the event module and configured to release an event action during the at least one live event; and an incentive module to identify occurrence of the event action within a defined time interval of the at least one live event and award an incentive in response to the identified occurrence of the event action.

According to another aspect, a method includes receiving real-time data of at least one live event; releasing an event action during the at least one live event; comparing the received real-time data of the at least one live event with the event action to determine occurrence of the event action within a defined time interval of the at least one live event; and awarding an incentive in response to the occurrence of the event action.

BRIEF DESCRIPTION OF THE DRAWINGS

Reference will now be made to the attached drawings, when read in combination with the following specification, wherein like reference numerals refer to like parts throughout the several views, and in which:

FIG. 2 is an illustration of an example dashboard configuration for a scheduled live event, according to one embodiment.

FIGS. 4A-4H are illustrative screenshots of a mobile device user interface, according to one embodiment.

DETAILED DESCRIPTION

Figure 1A:
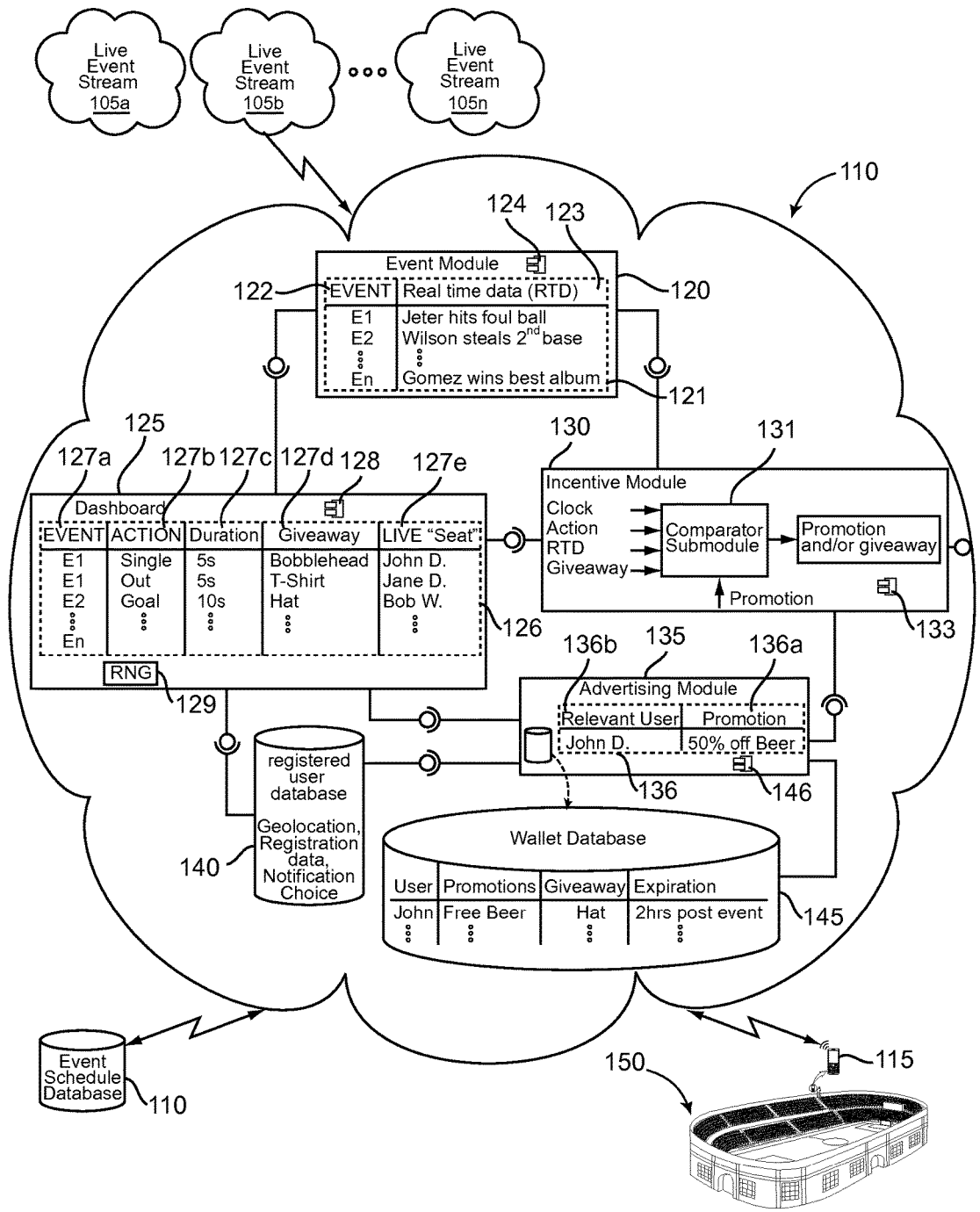
FIG. 1A is a schematic illustration of an application system configured to determine occurrence of a randomized event action within a live event during a defined duration of time, according to one embodiment.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

Sweepstakes are prize giveaways where the winners are chosen by luck. Prizes can range from stickers and t-shirts to houses, cars, and enormous cash wins. Contests, on the other hand, draw a winner based on some merit. The person with the funniest joke, most moving essay, most beautiful photograph, tastiest recipe, or whatever will be chosen as the winner.

The U.S. has strict laws barring private lotteries. A lottery is a promotion that has three elements: (1) prizes; (2) winners chosen by chance; and (3) consideration. To avoid being classified as an illegal lottery, sweepstakes must ensure that at least one of these elements is missing. Because prizes and luck are central to sweepstakes, where the winners are drawn at random, legitimate promotions cannot have consideration.

Sponsors use sweepstakes as a way of gaining new customers and making more profit, and sweepers get great prizes. By running a sweepstakes, sponsors create "buzz" about their products, encourage visiting websites, generate advertising content at a reasonable cost, generate market research, and strengthen the relationship between sponsor and customer. However, the drawback in current sweepstakes is that sweepers are not kept engaged for a prolonged period of time. Instead, participants enter the sweepstakes for a chance to win a prize at a known point in time. For example, participants enter name, email, phone number, and demographic information for a chance that their names will be randomly selected in a drawing scheduled to be held on a specific date and time.

It is desirable to keep participants engaged for a prolonged period of time, such that several sponsors have one or more opportunities to engage with them. Such a scenario would increase the amount of new customers and profits for sponsors. As such, it is desirable to have a system and method that causes a participant to be engaged throughout a live event for the chance that the participant is both (a) randomly selected to be eligible to win a prize, and (b) determined to have won the prize based on a random pre-set action occurring within the live event during a specific range of time.

Figure 1B:
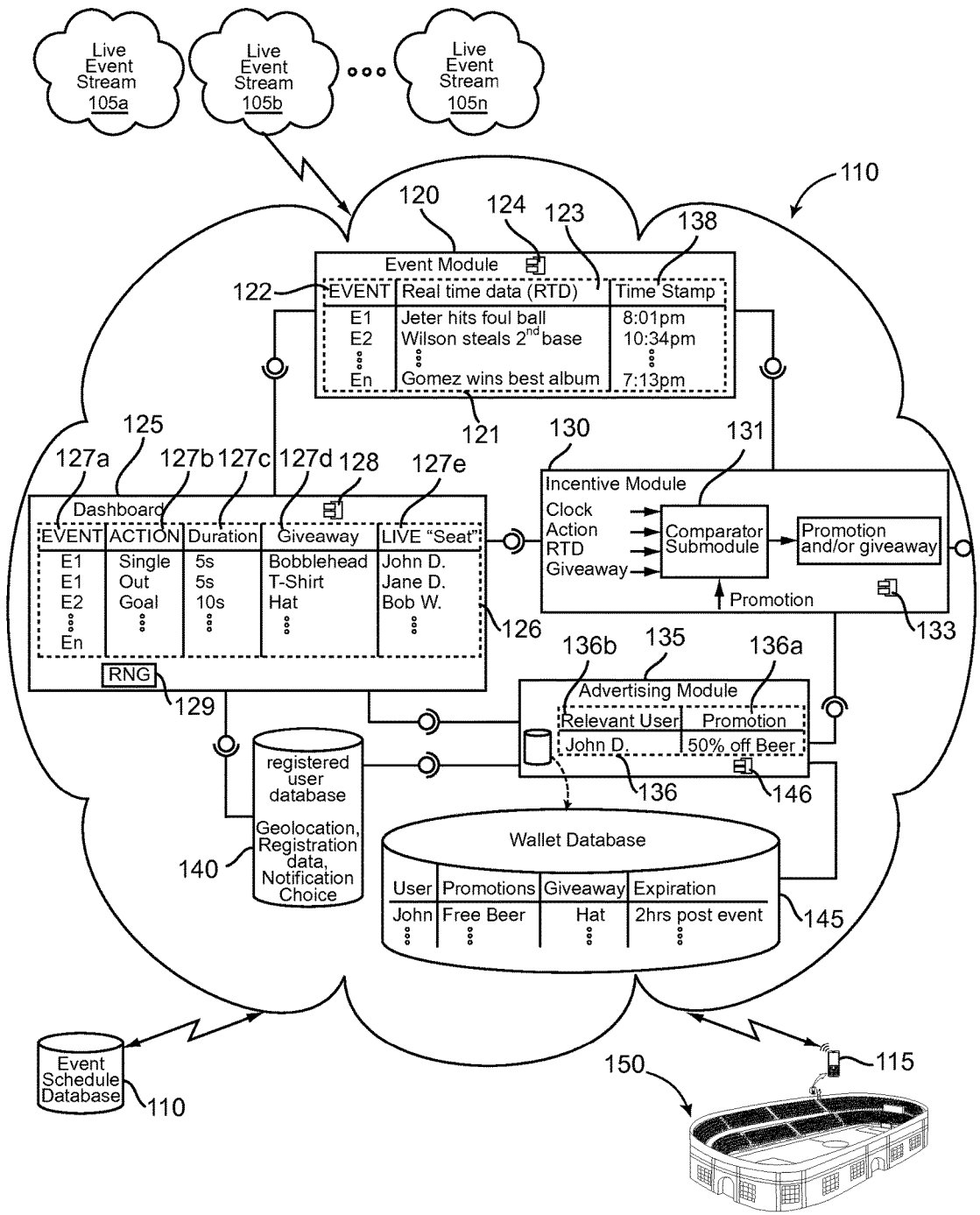
FIG. 1B is another schematic illustration of the application system of FIG. 1A, according to another embodiment.

FIG. 1A shows an illustration of an application system 100 (e.g., THE WINNING SEAT™) communicatively coupled to live event stream 105a, live event stream 105b, . . . , and live event stream 105n (collectively referenced as "live event stream 105"), event schedule database 110, and mobile device 115. FIG. 1B shows another schematic illustration of the application system 100 of FIG. 1A, according to another embodiment.

The live event stream 105 may be a multimedia stream that is constantly transmitted to and received by the application system 100. The multimedia stream may include media other than video and audio such as, for example, live closed captioning, ticker tape, and real-time text. The live event stream 105 may be delivered over the internet or any other communication medium via wired or wireless communication. In one embodiment, the application system 100 may employ a vendor such as, for example, STATS, Inc. to provide the live event stream 105 in real-time. The vendor may customize its live event stream 105 feeds into a digital format as defined by the application system 100. Alternatively, the application system 100 performs the customization of the received live event stream 105.

The event schedule database 110 is configured to store listings of current and future events including the scheduled start time for each. The event schedule database 110 may be a third party database accessible by the application system 100 to identify those events to be offered to users. Access to the event schedule database 110 may be via internet or any other communication medium via wired or wireless communication. Additionally, the event schedule database 110 may be publicly accessible.

The mobile device 115 may take the form of any smart phone, tablet, personal digital assistant (PDA), laptop, or the like and any combination thereof. The mobile device 115 may be communicatively coupled to the application system 100 via cellular network, WiFi (e.g., LAN, WAN, Bluetooth), mobile satellite communication, or the like. The mobile device 115 may be located in or around the vicinity of a live event 150. Alternatively, the mobile device 115 may be located remote from the live event 150, for example, in a user's home or sports bar. The live event 150 may, for example, be a sporting event (e.g., baseball, football, basketball, hockey, soccer, golf, etc.), concert, political event, live news program, auction, or the like. These are just a few examples of live events 150. One having ordinary skill in the art will appreciate that embodiments of the invention may include other forms of live events as well.

The application system 100 comprises an event module 120, a dashboard 125, an incentive module 130, an advertising module 135, and a registered user database 140. The event module 120 may include both data structures and algorithms that are applied to the data structures. The event module 120 takes the form of various forms of circuitry components (e.g., memory, processor, switches, servers, databases, and the like) operable to provide for implementation of the data structures and associated algorithms. In one embodiment, the event module 120 includes a real-time event (RTE) data structure 121 having an event field 122 and a real-time data (RTD) field 123, while in other embodiments the RTE data structure 121 further includes a time stamp field 138 (FIG. 1B). Additionally, the event module 120 includes a communication interface 124 operable to receive the live event stream 105. In one embodiment, the RTE data structure 121 receives the live event stream 105 via the communication interface 124 and processes it such that a live event title or a live event description is stored within the event field 122 (e.g., Yankees v. Dodgers, Grammy Awards, Oscars, etc.) and real-time event data is stored in the RTD field 123. The real-time event data may, for example, include play-by-play information (e.g., strikeout, foul ball, home run, single, goal, Macklemore wins best album, Picasso receives $1 million bid, etc.) or other real-time event data. In another embodiment, the event module 120 receives the live event stream 105 in a post-processed format such that the live event title or description and the real-time event data is received by the RTE data structure 121 in proper format sufficient for inclusion within the event field 122 and a RTD field 123. As such, the RTE data structure 121 provides for real-time data recordation for each of the live events 150 transmitted via the live event stream 105.

In an alternative embodiment illustrated in FIG. 1B, the time stamp field 138 receives a time stamp associated with each of the real time event data stored in the RTD field 123. The time stamp is a point in time where each of the real time event data occurred during the live event 150. The time stamp may record the time in terms of specific regional time zones (Pacific Standard Time, Mountain Standard Time, Eastern Standard Time, etc.), or may be recorded relative the start time of the live event 150 (e.g., 5 min and 40 sec into the live event 150, 34 min and 12 sec into the live event 150, etc.). Additionally, the time stamp may include hour/minute/second and a date (e.g., month/day/year) associated therewith.

The dashboard 125 comprises data structures, algorithms applied to the data structures, and various forms of circuitry components (e.g., memory, processor, switches, servers, databases, and the like) operable to provide for implementation of the data structures and associated algorithms. The dashboard 125 may be communicatively coupled to receive and/or access data from the event schedule database 110 and the registered user database 140. In one embodiment, the dashboard 125 includes an action data structure 126 having one or more fields 127. These one or more fields 127 may comprise at least one of a scheduled event field 127a, an action field 127b, a duration field 127c, a giveaway field 127d, and a LIVE "seat" field 127e. The scheduled event field 127a may, for example, receive event data from the event schedule database 110. The event data received by the scheduled event field 127a includes a scheduled date and start time of a live event scheduled to occur sometime in the future. The event schedule database 110 serves as a repository for scheduled events (e.g., sporting events, cultural events, award ceremony, and the like) and is communicatively coupled to the dashboard 125 via interface 128. The event schedule database 110 may be located within or outside of the application system 100.

The action field 127b of the action data structure 126 includes one or more defined event actions 222 (illustrated in FIG. 2) that have a probability of occurring within respective live events stored in the event schedule database 110. The event actions 222 may, for example, include base hit, fly out, ground out, goal, home run, "artist A wins best actress," "album B wins best album," etc. The action data structure 126 associates one or more of the defined event actions with respective ones of the scheduled events of the scheduled event field 127a and an associated giveaway or prize (described herein below).

The duration field 127c includes duration of time respective event actions from the action field 127b are to be displayed on the mobile device 115. The duration field 127c may include different durations of time for each live event 150, mobile device 115, giveaway 223 (illustrated in FIG. 2), or registered user. For example, the duration of time the one or more event actions 222 are displayed on the mobile device 115 may be 5 seconds, 10 seconds, 30 seconds, 60 seconds, or the like. Additionally, the duration of time may be lengthened or shortened in real-time by, for example, the application system 100 administrator while the event action 222 is being displayed on the mobile device 115.

The giveaway field 127d includes one or more winnable giveaways or prizes 223 (as illustrated in FIG. 2) available to selected registered users while respective ones of the event actions are displayed on their mobile devices 115. For example, as will be discussed in more detail herein, the selected registered user may win the displayed prize when the action event 222 displayed on the selected registered user's mobile device 115 occurs within the respective live event 150 anytime during the associated duration of time stored in the duration field 127c. The giveaway or prize 223 may, for example, be a bobblehead, gift card, memorabilia, T-shirt, hat, cash, or the like.

The LIVE "seat" field 127e includes those registered users that have been randomly selected by the dashboard 125 to make their "seats" LIVE. Transitioning a registered user's "seat" to LIVE means the application system 100 will transmit the event action from action field 127b to display on the registered user's mobile device 115 for the duration of time specified in the duration field 127c. If the displayed event action 222 occurs in the live event 150 within that duration of time, the registered user will win the giveaway 223 associated with the event action 222. The dashboard 125 may include a random number generator (RNG) 129 or employ any other randomization technique operable to randomly select one or more "seats" of the registered users for each of the live events 150 stored in event field 127a. As discussed in detail below, once selected, respective ones of the registered users' live event "seats" become LIVE. The RNG 129 may comprise a processor (e.g., microprocessor, one or more servers, or the like) that periodically accesses the registered user database 140 to randomly select "seats" of the registered users signed into the live events 150.

The registered user database 140 comprises a plurality of users who registered to gain access to the application system 100. In one embodiment, upon registration, a user may select a username and password to establish an account with the application system 100 and thereby establish registration. Prior to start of the live event 150 (e.g., within 1 hour prior to an event), the registered user may sign into a "seat" associated with the live event. The "seat" refers to the registered user indicating commitment to track the associated live event either in-person or by viewing on a television screen, PC, tablet, laptop, mobile device, or the like. As discussed above, the dashboard 125 may access the registered user database 140 and randomly select one or more "seats" associated with respective ones of the registered users to make LIVE.

The registered user database 140 may include various forms of demographic information of each registered user. The demographic information may, for example, include at least one of gender, age, marital status, head of household status, household size, presence by age in household, race/ethnicity, household income, type of housing, region based on state of residence, and the like. Such demographic information may be voluntarily submitted by the users upon registration into the application system 100. The registered user database 140 may also include real-time geographic information associated with the registered users based on each of the registered users' mobile device 115 GPS coordinates. It will be appreciated by those having ordinary skill in the art that various techniques for determining the real-time geographic information of mobile devices 115 are known. Some example techniques include: utilizing a service provider's network infrastructure to identify the location of the mobile device 115, installation of client software on the mobile device 115 to determine its location, and obtaining raw radio measurements from a SIM card within the mobile device 115. In one embodiment, the application system 100 obtains geographic location information of the mobile devices 115 from one or more mobile device service providers.

Additionally, the registered users may indicate specific notification settings desired when their "seat" goes LIVE, the registered users are deemed to have won/lost the giveaway 223, and the live event 150 has concluded. Such notification settings may be stored in the registered user database 140. Some examples of types of notifications include at least one of vibration, sound, illumination, display screen push notification, or the like. It will be understood by those having ordinary skill in the art that push notification includes SMS (Short Message Service) or in-app notification.

The incentive module 130 comprises data structures, algorithms applied to the data structures, and various forms of circuitry components (e.g., memory, processor, switches, servers, databases, and the like) operable to provide for implementation of the data structures and associated algorithms. The incentive module 130 may be communicatively coupled to the event module 120, the dashboard 125, and the advertising module 135. The incentive module 130 may include one or more comparator sub-modules 131 operable to compare, for each LIVE "seat," the defined action 222 from the action field 127*b* with the real-time event data from the RTD field 123 to determine occurrence of the defined action 222 anytime within the duration of time specified in the associated time duration field 127*c*. The one or more comparator sub-modules 131 continue to receive the real-time event data from the RTE data structure 121 as long as the defined time duration has not expired. The one or more comparator sub-modules 131 may employ a clock to track passage of time from when a "seat" goes LIVE to when the defined duration of time expires.

If, prior to expiration of the defined time duration for the respective LIVE "seat," the one or more comparator sub-modules 131 detect occurrence of the defined action 222 within the live event 150, the one or more comparator sub-modules 131 access the giveaway or prize data stored in the associated giveaway field 127*d* for transmission to the mobile device 115 via a communication interface 133. Alternatively, if the defined time duration for the respective LIVE "seat" expires without detecting occurrence of the defined action 222 within the live event 150, the one or more comparator sub-modules 131 neither access nor transmit the giveaway or prize data stored in the associated giveaway field 127*d*. However, regardless of whether detection of the defined action 222 occurs within the defined time duration of the live event 150, the one or more comparator sub-modules 131 access a promotion from the advertising module 135 (described in more detail below) for transmission to the mobile device 115 via the communication interface 133. It will be appreciated by those having ordinary skill in the art that the communication interface 133 may be located within or outside of the incentive module 130.

In the alternative embodiment of FIG. 1B, similarly to FIG. 1A, the one or more comparator sub-modules 131 compares, for each LIVE "seat," the defined action 222 from the action field 127*b* with the real-time event data from the RTD field 123 to determine occurrence of the defined action 222 anytime within the duration of time specified in the associated time duration field 127*c*. However, in the FIG. 1B embodiment, the comparison of the defined action 222 with the real-time event data occurs after the defined duration has expired. Upon expiration of the defined duration of time, the incentive module 130 retrieves the real-time event data having associated time stamps that fall within the defined duration of time. For example, if the duration is a 60 second interval occurring between 8:01 pm-8:02 pm, the real-time event data having associated time stamps within 8:01 pm-8:02 pm will be retrieved. Then, the one or more comparator sub-modules 131 compare each of the retrieved real-time event data with the defined action 222 to determine whether there is an occurrence.

In FIG. 1B, if upon expiration of the defined time duration, the one or more comparator sub-modules 131 detect occurrence of the defined action 222, the one or more comparator sub-modules 131 access the giveaway or prize data stored in the associated giveaway field 127*d* for transmission to the mobile device 115 via a communication interface 133. Alternatively, if the one or more comparator sub-modules 131 fail to detect occurrence of the defined action 222, the one or more comparator sub-modules 131 neither access nor transmit the giveaway or prize data stored in the associated giveaway field 127*d*. However, regardless of whether detection of the defined action 222 occurs, the one or more comparator sub-modules 131 access a promotion from the advertising module 135 (described in more detail below) for transmission to the mobile device 115 via the communication interface 133.

The advertising module 135 comprises data structures, algorithms applied to the data structures, and various forms of circuitry components (e.g., memory, processor, switches, servers, databases, and the like) operable to provide for implementation of the data structures and associated algorithms. The advertising module 135 may receive and store promotions from one or more vendors (not illustrated) and associated expiration dates (not illustrated). The promotions may, for example, include 2 FOR 1 DRINKS, 35% OFF RUNNING SHOES, BUY 1 TEAM T-SHIRT GET 1 FREE, 20% OFF DINNER, etc. The expiration time of some promotions may, for example, take the form of one or two hours after the live event 150 and up to one year after the live event 150. The advertising module 135 includes promotions data structure 136 configured to determine the promotions most relevant to respective registered users. The promotions data structure 136 has a promotion field 136a configured to receive the one or more promotions and a relevant user field 136b configured to receive the registered user deemed most relevant or having a high likelihood of conversion for a particular promotion. In one embodiment, the promotion is communicated to the registered user's mobile device 115 upon expiration of the defined time duration in response to the registered user's "seat" becoming LIVE. In another embodiment, a promotion is communicated to the mobile device 115 during the defined time duration of the registered user's "seat' becoming LIVE. It will be appreciated by those having ordinary skill in the art that the promotion may be communicated to the relevant user's mobile device 115 at any time including, for example, upon registration into the application system 100, sign-in to the live event 150, or upon completion of the live event 150. In one example, the advertising module 135 may communicate the promotion via communication interface 146 or have the incentive module 130 access the advertising module 135 for transmission via communication interface 133.

The promotions data structure 136 processes the registered users' registration data, which was provided upon registration to the application system 100, to determine the conversion probability for respective promotions. The advertising module 135 accesses registration information from the registered user database 140 of registered users and compares to the one or more promotions to calculate likelihood of conversion or conversion probability for each user. The advertising module 135 may additionally consider the geolocation information associated with the registered users in determining likelihood of conversion for each of the one or more promotions. As such, respective ones of the promotions in the promotions field 136a are associated with those registered users having the highest conversion probability. For example, a registered user with a LIVE "seat" who is 23 years old, male, watching a baseball game, no children, and located near MIKE'S BISTRO will be deemed to have a higher conversion probability for a "MIKE'S BISTRO: FREE BEER AND FRIES AFTER GAME" promotion than a 70 year old male, 5 grandkids, watching the same baseball game, 20 miles away from MIKE'S BISTRO.

The application system 100 further includes a wallet database 145 configured to store the respective giveaways, promotions, and promotion expirations for each registered user. The wallet database 145 may be located within or outside of the advertising module 135. Regardless of location, the advertising module 135 is communicatively coupled to the wallet database 145. In some embodiments, the giveaways, promotions, and associated expiration data accumulated by each registered user throughout the one or more live events 150 is automatically stored in the wallet database 145, while in other embodiments respective registered users must take an affirmative action to store each identified giveaway, promotion, and associated expiration data as it's displayed on the mobile device 115. The data stored in the wallet database 145 may be accessed by respective registered users at, for example, point of sale in order to redeem the giveaway and/or promotion. The registered user may log into his/her wallet account and display a selected promotion or giveaway to a merchant for redemption.

FIG. 2 shows an example dashboard configuration 200 for a scheduled live event 205 according to one illustrated embodiment. Here, the scheduled live event 205 is a Dodgers v. Yankees baseball game. The example dashboard configuration 200 may include a summary board 210, visitor team board 220, and home team board 230 operable to either be automatically updated or manually controlled by an administrator.

The summary board 210 may be dynamically updated based at least on one of the number of registered users that sign into the live event 205 (here the Dodgers v. Yankees game), a giveaway display time 211, and elapsed live event time 216. In the illustrated summary board 210 example, there are 25,000 registered users who signed into a "seat" of the live event 205. The summary board 210 tracks the giveaway display time 211 which refers to the amount of time 211 (e.g., number of seconds) each of the event actions 222 and associated giveaways 223 are displayed on each of the user devices 115. Alternatively, the display time 211 may refer to an average amount of time each of the event actions 222 and associated giveaways 223 are displayed on each of the user devices 115. The summary board 210 further tracks the aggregate number of giveaways per minute 212, per hour 213, released simultaneously 214, and displayed/viewed per hour 215 on the mobile devices 115 for the live event 205. Additionally, an average number of times respective giveaways 223 are viewed per person 217 is calculated by: (displayed/viewed per hour 215×elapsed game time 216)/(number of registered users signed into a "seat"). An average number of times giveaways are viewed/person/hour 218 is tracked by dividing the views per person 217 by the elapsed game time 216.

Because the promotions are displayed on the user devices 115 at various points throughout the giveaway process (e.g., during on-screen countdown while the defined action is displayed, during the on-screen notification of whether giveaway is won, at conclusion of live event), by tracking the average number of times each registered and signed-in user views respective giveaways 217, the application system 100 can determine a number of impressions of each of the promotions displayed throughout the live event 205. According to one illustrated embodiment, the total impressions per live event 219 may be illustrated in terms of live screen, results screen, and game over impressions. The live screen impressions refer to total user impressions for promotions displayed during on-screen countdown (e.g., 5 s, 4 s, 3 s, 2 s, 1 s, 0 s) while a "seat" is LIVE. The results screen impressions refer to total user impressions for promotions displayed during the on-screen notification of whether the associated giveaway is won. The "game over" impressions refer to total user impressions for promotions displayed during the on-screen game over notification.

Additionally, the summary board 210 may include a wallet count referring to a total number of the promotions stored in the wallet database 145 for all the signed-in users. In one embodiment, the promotions are automatically stored in the respective users' wallet account within the wallet database 145, while in other embodiments the promotions are stored in response to the respective users taking an affirmative action to store select promotions (e.g., selecting the promotion via touch screen or mouse as it appears on the mobile device 115 screen).

Although FIG. 2 illustrates both the visitor board 220 (e.g., Dodgers) and home team board 230 (e.g., Yankees)

separately, those having ordinary skill in the art will appreciate that the dashboard configuration 200 may alternatively take the form of a single board including both visitor and home teams or more than two boards. Hereinafter, the visitor board 220 (e.g., Dodgers) and home team board 230 (e.g., Yankees) will be collectively referenced as the boards 220, 230. The boards 220, 230 include one or more giveaway cells 240 (numbered in FIG. 2 from 1 to 16) which track data associated with respective giveaways 223 throughout the live event 205.

The dashboard 125 determines an amount and types of giveaways 223 to allocate for each live event 205. Additionally, the dashboard 125 sets predefined event actions 222 prior to the live event 205. The event actions 222 may include at least one of generic actions pertaining to the scheduled live event 205 (e.g., anybody hits a single) and specific actions directed to a live event participant (e.g., David Adams hits a double). For each giveaway cell 240, a maximum number of giveaways 224 are allotted and the dashboard 125 is set to release a defined number of giveaways simultaneously 225 with the associated event actions 222 to respective registered users signed into the live event 205 and having "seats" randomly selected to be LIVE. Upon simultaneous release of the defined number of giveaways 225 along with the event actions 222 and notification of win or lose on the mobile devices 115, the dashboard 125 may subsequently release the defined number of giveaways 224 and the associated event actions 222 several times thereafter to other randomly selected LIVE "seats" until all allotted giveaways 224 have been won by the registered users in the LIVE "seats."

The boards 220, 230 include control cells 250 illustrated as "Start," "Pause," and "Stop." In the illustrated embodiment, the first seven giveaway cells 240 have started simultaneous release of the giveaways 223 along with the associated event actions 222 and are in the "Running" state. This may, for example, be in response to the application system 100 administrator initiating running of the giveaway cells 240 or automatically generated by the dashboard 125. Having respective ones of the giveaway cells 240 in the "Running" state refers to the event action 222 and the associated giveaways 223 being transmitted for display on the mobile devices 115 of those registered users having LIVE "seats." The transmitted event action 222 and the associated giveaways 223 are displayed on the mobile devices 115 for a defined duration 226 (e.g., 5 seconds, 10 seconds, 30 seconds, 60 seconds, or the like). Subsequent releases of the giveaways 223 along with the associated event actions 222 by respective ones of the "Running" giveaway cells 240 may occur upon expiration of a defined time interval 227 after the notification of win or lose on the mobile devices 115.

The "Pause" control cell 250 allows the application system 100 administrator to pause release (either initial or subsequent release) of the giveaways 223 along with the associated event actions 222. In one embodiment, the administrator may pause the release because the event action 222 associated with the respective giveaway 223 is not relevant to the live event 205 scenario currently being streamed. For example, if a specific player referenced in the event action 222 is currently not participating in the live event (e.g., the player strikes out and will not be at bat for another 3 innings or so), the administrator may pause the subsequent releases of the giveaways 223 and associated event action 222 till that player participates again (e.g., bats again).

The "Stop" control cell allows the application system 100 administrator to stop release (either initial or subsequent release) of the giveaways 223 along with the associated event actions 222. In one embodiment, the administrator may stop the release because the specific player who is called out in the event action 222 is no longer participating in the live event (e.g., the player is hurt and leaves the game). As such, by initiating a "stop," the administrator may, for example, manually edit the event action 222 by removing that injured player or perhaps by replacing the injured player who left the live event 205 with a replacement player. Alternatively, the administrator may edit the number of giveaways allotted for simultaneous release 225 or may make any other edits to any of the giveaway cells 240.

It will be appreciated by those having ordinary skill in the art that the event actions 222 could be changed by the administrator in real-time during the live event 205 and that the dashboard 125 is not limited to the one or more defined event actions 222 that have been set prior to start of the live event 205.

Furthermore, each of the giveaway cells 240 may include an allocation of maximum total cost 228 for all allotted giveaways 223 per event action 222 as well as a per giveaway cost breakdown 229. Such allocation allows the administrator to monitor budgeting constraints in real-time during the live event 205.

Figure 3:
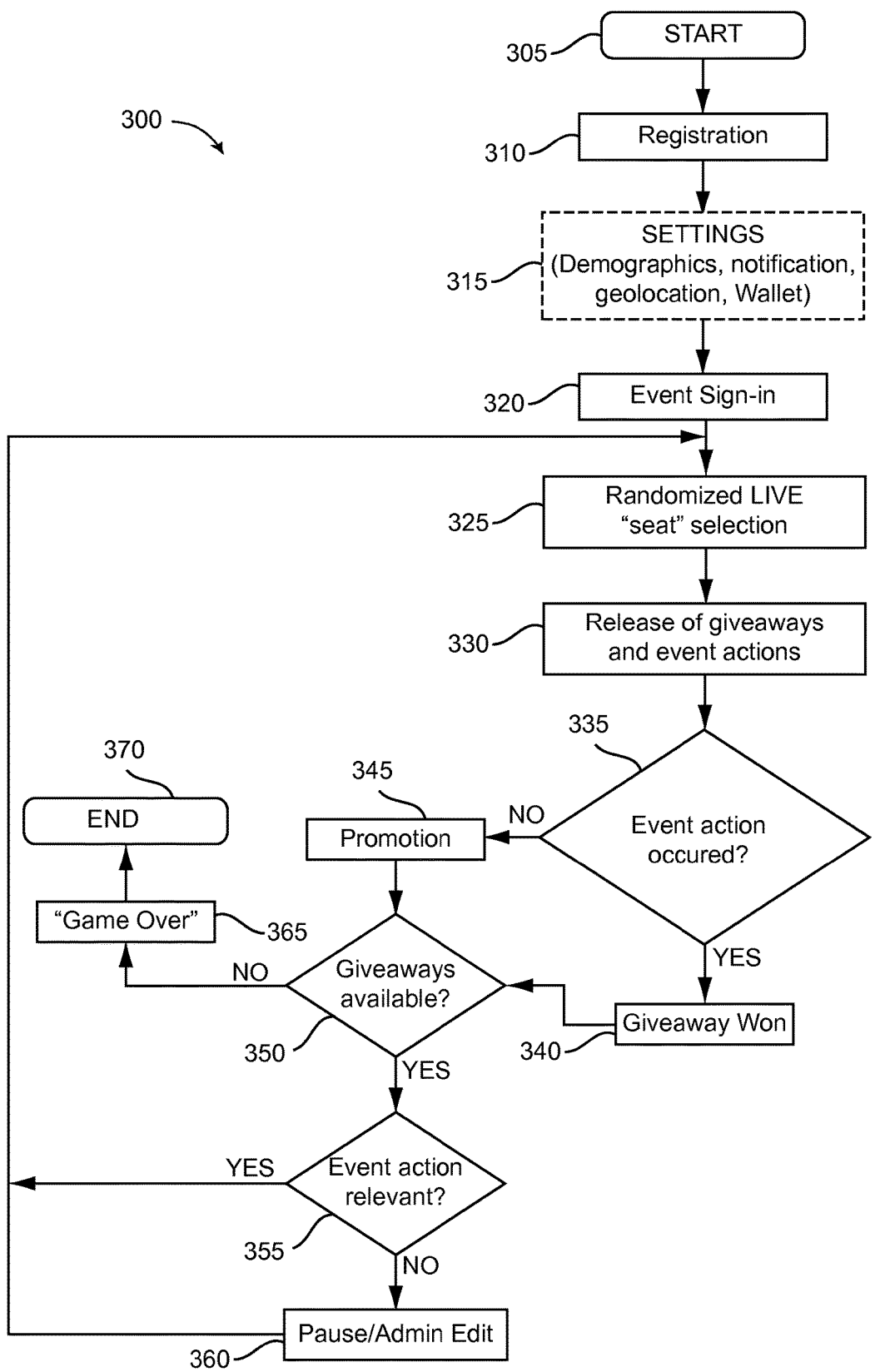
FIG. 3 is a flow chart of a method for linking a real-time sweepstakes promotion to a live event, according to one embodiment.

FIG. 3 is a flowchart of a method 300 implemented by the application system 100 for linking a real-time sweepstakes promotion to a live event, according to one illustrated embodiment. FIGS. 4A-4H are illustrative screenshots of a mobile device user interface, according to one illustrated embodiment. Hereinafter, reference will be made to the flowchart of FIG. 3 in conjunction with FIGS. 4A-4H.

The method begins at 305 in response to a user downloading an application configured to access the application system 100. The downloaded application may, for example, be a mobile app that is downloaded to the user's mobile device 115 and available for download via iOS, Android, or Windows operating platforms. In some embodiments the mobile app may be free, while in other embodiments there may be a cost associated with downloading the application. Hereinafter, reference will be made to the application as a mobile app. However, it will be appreciated by those having ordinary skill in the art that the application can also be a non-mobile app and reference is being made to a mobile app merely for illustration purposes.

At 310, the user registers for access to the application system 100 (e.g., THE WINNING SEAT™). FIG. 4A shows the user interface upon initial registration by the user. Upon initial registration, the user may, for example, provide first and last names, email address, and mobile phone number. Additionally, the user may be asked to agree to terms and conditions associated with use of the mobile app. The user may then create a username and password which can be used in subsequent sign-ins to the mobile app, as illustrated in FIG. 4B.

Optionally at 315, the user may be prompted to provide demographic information such as, for example, at least one of gender, age, marital status, head of household status, household size, presence by age in household, race/ethnicity, household income, type of housing, region based on state of residence, and the like. Such demographic information may be voluntarily submitted by the user upon registration into the application system 100 or anytime post registration by updating the user's settings.

Additionally, during settings step 315, a user may be asked to select a notification choice for being notified when the user's "seat" goes LIVE, the user wins/loses the giveaway 223, and the live event 205 has concluded. The notification choice may include at least one of vibration, sound, illumination, display screen push notification, or the like. The notification choice as well as any other settings information may be updated by the user anytime. Furthermore, upon registration, a user wallet account 410 (see FIG. 4H) is established which allows access to a portion of the wallet database 145 pertaining to the registered user. The user has an option to automatically save all promotions and earned giveaways to the user wallet account or to save only the promotions and giveaways the user affirmatively selects while displayed on the mobile device 115.

In yet a further embodiment, the settings step 315 may include a determination by the user on whether to turn ON or OFF location services associated with the mobile device 115. The location services use GPS along with crowd-sourced Wi-Fi hotspot and cell tower locations to determine approximate location. As mentioned above, the geolocation information gathered by the mobile device 115 service provider may be leveraged by the application system 100 to better gauge conversion probability of the promotions with respect to those registered users. For example, a registered user located in Brooklyn, N.Y. and watching a live event will have a higher conversion probability for a Brooklyn Pizzeria promotion than another registered user located in Chicago, Ill. watching the same live event.

Figure 4C:
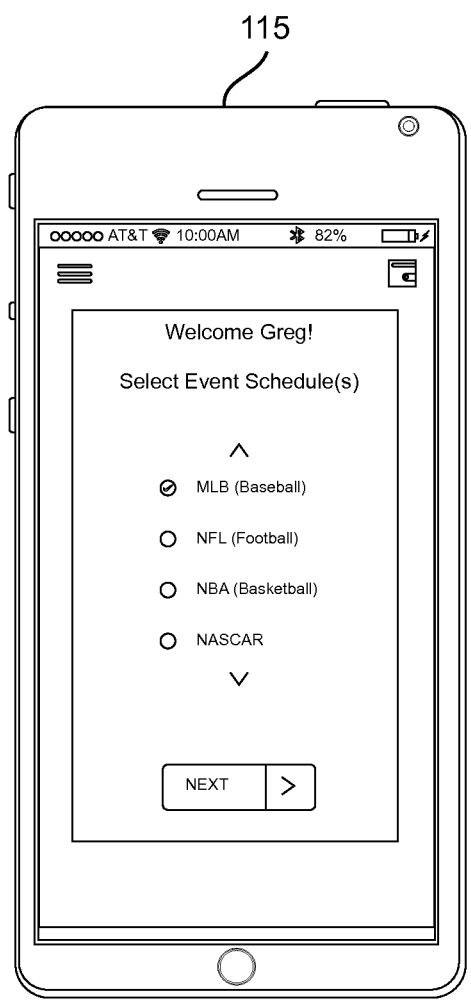
Figure 4D:
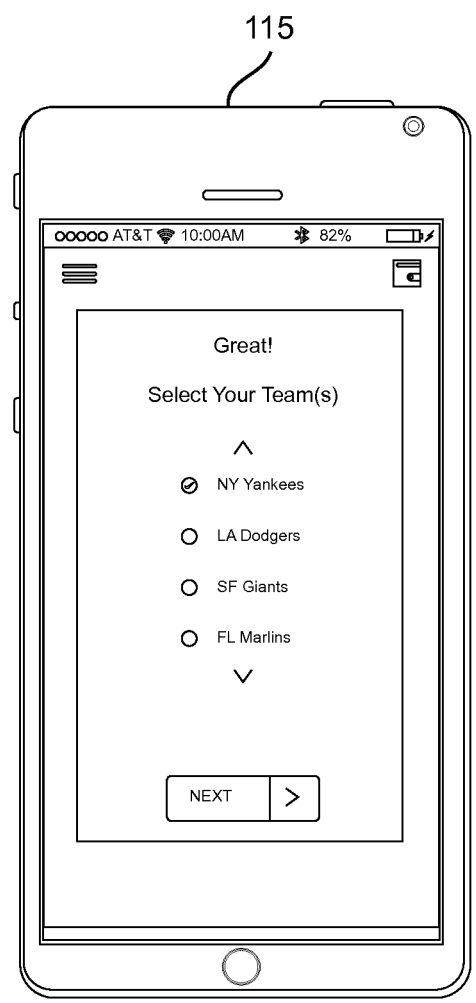

At 320, the registered user can sign into a "seat" for a specific live event. FIGS. 4C-4D depict screenshot illustrations of selecting a scheduled live event. In FIGS. 4C-4D, the event schedule is narrowed to MLB (Major League Baseball) and then to the NY Yankees. The registered user may then select a specific Yankees game to sign into (not shown). Once the registered user signs into the specified live event (e.g., Yankees game), the user is deemed to have signed into a "seat" in that live event.

Figures 4E, 4F:
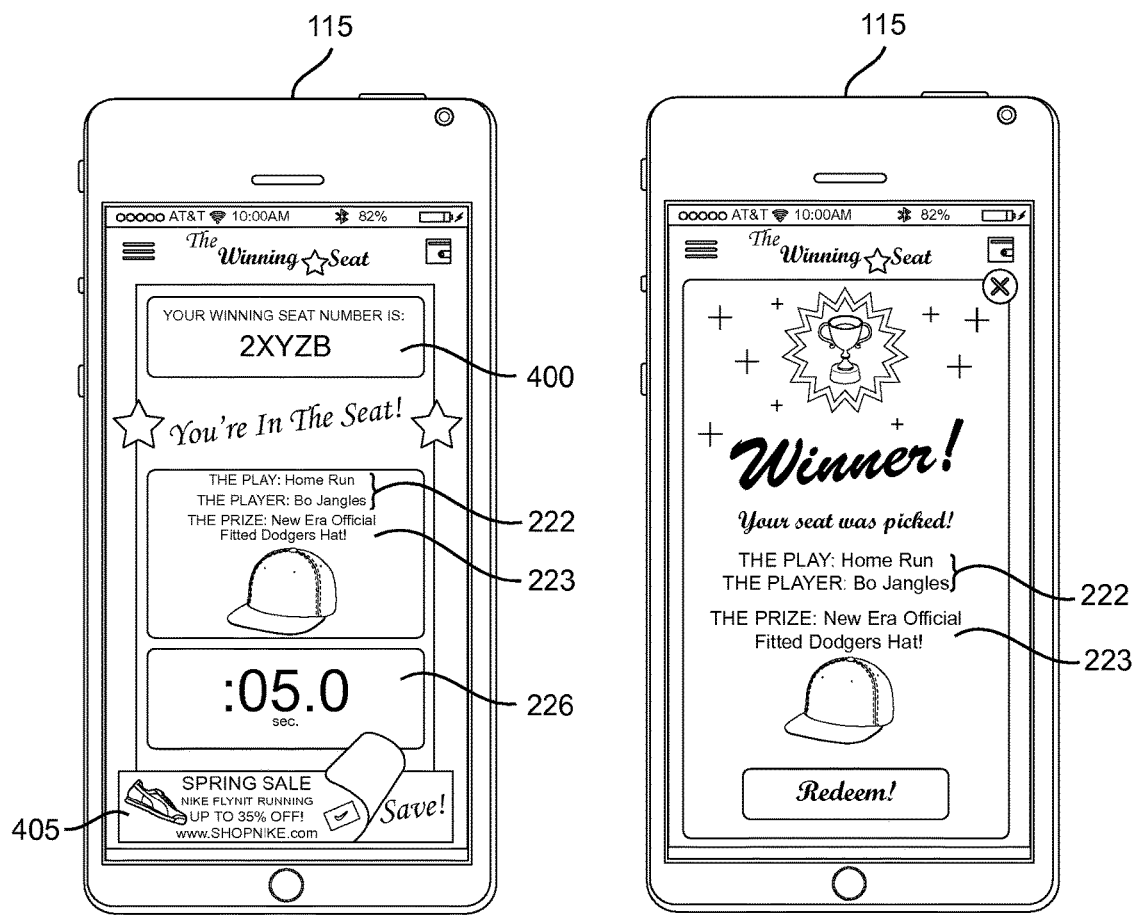

At 325 and as illustrated in FIG. 4E, the dashboard randomly selects registered users to make their "seats" LIVE by accessing the registered user database 140 and randomly selecting one or more "seats" 400 associated with respective ones of the registered users. At 330, the dashboard 125 simultaneously releases the defined number of giveaways 225 with the associated event action 222 to respective registered users signed into the live event 205 and having LIVE "seats" 400 that have been randomly selected. The transmitted event actions 222 and the associated giveaways 223 are displayed on the mobile devices 115 for the defined duration 226 (e.g., 5 seconds, 10 seconds, 30 seconds, 60 seconds, or the like). The mobile device 115 alerts the user that his/her "seat" has become LIVE via at least one of the notification choices selected by the user (e.g., vibration, sound, light, display screen push notification, or the like). Additionally, a promotion 405 is communicated and displayed on the mobile device 115 during the defined time duration 226 of the registered user's "seat" 400 becoming LIVE. As discussed above, the promotion 405 may be selected by the advertising module 135 for display on the mobile device 115 based on at least one of the registered user's registration information and geolocation data. Depending on the user settings in step 315, the promotion 405 is either automatically stored in the user wallet account 410 (see FIG. 4H) or manually selected by the user for storage in the user wallet account 410 (see FIG. 4H).

At 335, the one or more comparator sub-modules 131 compare, for each LIVE "seat," the event action 222 with the real-time event data from the event module 120 to determine occurrence of the event action 222 anytime within the defined time duration 226 of the live event 205. According to one embodiment illustrated in FIG. 1A, the one or more comparator sub-modules 131 continue to receive the real-time event data from the event module 120 as long as the defined time duration 226 has not expired and compare the real-time event data with the event action 222 in substantially real-time.

According to another embodiment illustrated in FIG. 1B, upon expiration of the defined time duration 226, the incentive module 130 retrieves the real-time event data having associated time stamps that fall within the defined time duration 226. Then, the one or more comparator sub-modules 131 compare each of the retrieved real-time event data with the defined action 222 to determine whether there is an occurrence. As illustrated in FIG. 4E, the time duration 226 may be displayed as a countdown timer on the mobile device 115.

At 340 and as illustrated in FIG. 4F, if for the respective LIVE "seat" 400 the one or more comparator sub-modules 131 detect occurrence of the event action 222 within the live event 205, the user is deemed to have won the giveaway or prize 223 and a "Winner!" notification is displayed on the mobile device 115. Depending on the user settings in step 315, the giveaway 223 is either automatically stored in the user wallet account 410 or manually selected by the user for storage in the user wallet account 410. Additionally, the dashboard 125 subtracts the allotted number of simultaneous release giveaways 225 from the available number of giveaways 224. Control passes to 350.

At 345 and as illustrated in FIG. 4G, if for the respective LIVE "seat" 400 the one or more comparator sub-modules 131 fail to detect occurrence of the event action 222 within the live event 205, the user receive a notification of failure to win the giveaway 223. However, the promotion 405 (e.g., 2 FOR 1 DRINKS @ SAL'S SUDS & SPORTS) may still be selected by the advertising module 135 for display on the mobile device 115 based on at least one of the registered user's registration information and geolocation data. The promotion 405 may, for example, take the form of a full screen pop-up 415. Depending on the user settings in step 315, the promotion 405 is either automatically stored in the user wallet account 410 (see FIG. 4H) or manually selected by the user for storage in the user wallet account 410 (see FIG. 4H).

At 350, after the simultaneous release of the defined number of giveaways 225 along with the event actions 222 and displaying the win or lose notification on the mobile devices 115, the dashboard 125 determines whether there are any available number of giveaways 224 associated with respective event actions 222.

At 355, if available giveaways 224 exist for respective event actions 222 and the event actions 222 are still relevant to the live event 205, control passes back to 325. If available giveaways 224 exist for respective event actions 222 but the event actions 222 are not currently relevant to the live event 205, then the method 300 passes control to 360. At 360, the method 300 pauses until the event actions 222 become relevant again or until the administrator edits the event actions 222 to make one or more of the event actions 222 currently relevant to the live event. For example, if the event action 222 is a "Derek Jeter Strikeout" and it occurs prior to countdown expiration, then the event action 222 won't be relevant again until Derek Jeter is up to bat again. Hence, that event action 222 and associated giveaway 223 will not be displayed until either Jeter is up to bat again or the administrator changes the event action 222 to be directed to another player or no player at all.

Consequently, once the event actions 222 associated with the remaining available giveaways 224 are relevant, control passes back to 325. Otherwise, if there are no available giveaways 224 for respective event actions 222, control passes to 365.

At 365, when the live event 205 ends the user receives a "Game Over" notification. As illustrated in FIG. 4H, the mobile device 115 may display the user wallet account 410 indicating those promotions and giveaways 223 which are redeemable. The method ends at 370.

It will be recognized by those having ordinary skill in the art that the above recited steps may be implemented in different order without departing from the scope of embodiments of the invention. Additionally, the method 300 may include more or fewer steps than those recited above as deemed necessary to carry out the functions of various embodiments discussed above and in the claims.

Having described some embodiments of the invention, additional embodiments will become apparent to those skilled in the art to which it pertains. Specifically, one embodiment may replace the mobile device 115 with a non-mobile device including any number of different computing devices such as, for example, personal computer (PC), mainframes, servers or the like. Additionally, reference has been made to a mobile device but embodiments apply to one or more mobile devices of different users or a single user having more than one mobile device communicatively coupled to the application system 100 simultaneously.

Although reference was made to an event, embodiments are applicable to multiple live events streaming concurrently. Additionally, the above describe examples of event actions are not limiting but rather serve to illustrate some embodiments of the invention. For example, the application system 100 may also be applicable to live auctions, concerts, political debates, live news programs, award ceremonies, etc.

The dashboard may include more or less than the fields recited above and should not be construed as limited to the recited fields. Additionally, the dashboard configuration of FIG. 2 may include more or fewer fields, cells, and columns to implement the embodiments and is not limited to the specific illustrated configuration.

Furthermore, it will be appreciated by those having ordinary skill in the art that the application system 100 may be one single module or multiple distributed modules.

While the particular methods, devices and systems described herein and described in detail are fully capable of attaining the above-described objects and advantages of the invention, it is to be understood that these are the presently preferred embodiments of the invention and are thus representative of the subject matter which is broadly contemplated by the present invention, that the scope of the present invention fully encompasses other embodiments which may become obvious to those skilled in the art, and that the scope of the present invention is accordingly to be limited by nothing other than the appended claims, in which reference to an element in the singular means "one or more" and not "one and only one", unless otherwise so recited in the claim.

It will be appreciated that modifications and variations of the invention are covered by the above teachings and within the purview of the appended claims without departing from the spirit and intended scope of the invention. For example, the structures or methods of linking a real-time sweepstakes promotion to a live event may comprise several discrete modules that together still provide the same functionality and/or may encompass combined steps or several intermediate steps that do not detract from the higher level functionality described therein.

The invention claimed is:

1. A system comprising:
an event module comprising one or more data structures configured to receive real-time event data of at least one live event;
a dashboard communicatively coupled to the event module and configured to release an event action during the at least one live event;
a database of registered users communicatively coupled to the dashboard wherein at least a portion of the registered users are signed into one or more seats associated with the live event, the dashboard configured to randomly select the one or more seats to make LIVE, the event action is released to the randomly selected one or more LIVE seats; and
an incentive module to identify occurrence of the event action within a defined time interval of the at least one live event and award an incentive in response to the identified occurrence of the event action.

2. The system of claim 1, wherein the incentive module is configured to identify occurrence of the event action during the defined time interval.

3. The system of claim 1, wherein the incentive module is configured to identify occurrence of the event action upon expiration of the defined time interval.

4. The system of claim 1, wherein the event action is a pre-set action generated by the dashboard prior to the live event.

5. The system of claim 1, wherein the event action is determined based on similar real-time event data being collected later in time during the live event.

6. The system of claim 1, wherein the event action released to the randomly selected one or more LIVE seats has the incentive associated therewith.

7. The system of claim 6, wherein the incentive comprises a giveaway prize such as at least one of a gift card, t-shirt, memorabile, bobblehead, and baseball cap.

8. The system of claim 6, further comprising a user device communicatively coupled to the incentive module and configured to display the event action for the defined time interval during the live event.

9. The system of claim 8, wherein the user device displays a countdown of the defined time interval concurrently with display of the event action.

10. The system of claim 9, wherein the user device provides a notification in the form of at least one of a ring, vibration, illumination, and display screen push notification in response to the displayed countdown.

11. The system of claim 10, wherein the user device displays a promotion concurrently with the countdown, the promotion being displayed on a portion of the user device display screen.

12. The system of claim 11, wherein the user device displays a full-screen promotion upon expiration of the countdown.

13. The system of claim 12, wherein the user device displays the incentive upon expiration of the countdown in response to the identified occurrence of the event action.

14. The system of claim 13, wherein the promotion is targeted to the registered user whose seat was randomly selected during the live event.

15. The system of claim 14, wherein the promotion is relevant to the geographic location of the user device associated with the registered user whose seat was randomly selected during the live event.

16. The system of claim 15, further comprising a wallet database configured to store at least one of the promotion and incentive retrievable by the user device.

17. The system of claim 15, wherein the user device comprises a mobile device such as a smart phone, tablet, laptop, or interactive TV.

18. The system of claim 17, wherein the defined time interval comprises one of a 5 sec., 10 sec., 15 sec., 20 sec., 30 sec., 45 sec., or 60 sec. interval during the live event.

19. The system of claim 8, further comprising an advertising module communicatively coupled to the incentive module and operable to receive a plurality of promotions directed to the registered users signed into the one or more seats associated with the live event.

20. The system of claim 19, wherein the advertising module is operable to obtain geographic location coordinates of the user device associated with the at least one registered user whose seat was randomly selected during the live event and push geographically relevant promotions to the user device associated with the at least one registered user.

21. The system of claim 1, wherein the event is a live: sporting event, concert, awards ceremony, news program, political event, or the like.

22. The system of claim 1, wherein the real-time event data includes play-by-play data such as at least one of a strikeout, foul ball, home run, goal, single, and double.

23. A method comprising:
receiving real-time data of at least one live event;
storing one or more registered users signed into one or more seats allotted for the least one live event;
releasing an event action during the at least one live event, including releasing the event action to the one or more seats that have been randomly selected as LIVE;
comparing the received real-time data of the at least one live event with the event action to determine occurrence of the event action within a defined time interval of the at least one live event; and
awarding an incentive in response to the occurrence of the event action.

24. The method of claim 23, wherein comparing the received real-time data comprises comparing the received real-time data with the event action during the defined time interval.

25. The method of claim 23, wherein comparing the received real-time data comprises comparing the received real-time data with the event action upon expiration of the defined time interval.

26. The method of claim 23, further comprising determining the event action to release based on similar real-time event data to be received later in time during the live event.

27. The method of claim 23, wherein releasing the event action further includes associating the incentive therewith.

28. The method of claim 27, wherein associating the incentive therewith comprises associating a giveaway prize such as at least one of a gift card, t-shirt, memorabile, bobblehead, and baseball cap with the event action.

29. The method of claim 28, further comprising displaying the event action on a user device for the defined time interval during the live event.

30. The method of claim 29, wherein displaying the event action includes displaying a countdown of the defined time interval on the user device concurrently with the displaying of the event action.

31. The method of claim 30, wherein displaying the event action includes providing a notification to the user device in the form of at least one of a ring, vibration, illumination, and display screen push notification.

32. The method of claim 31, wherein displaying the event action includes displaying a promotion concurrently with the countdown on a portion of the user device display screen.

33. The method of claim 32, wherein displaying the event action includes displaying the promotion on a full-screen of the user device upon expiration of the countdown.

34. The method of claim 32, wherein awarding the incentive includes displaying the incentive on the user device upon expiration of the countdown in response to the occurrence of the event action.

35. The method of claim 33, wherein displaying the promotion includes selecting the promotion that specifically targets the registered user whose seat was randomly selected during the live event.

36. The method of claim 35, wherein selecting the promotion includes selecting the promotion relevant to a geographic location of the user device associated with the registered user whose seat was randomly selected.

37. The method of claim 35, further comprising storing at least one of the promotion and the incentive in a wallet database retrievable by the user device.

38. The method of claim 29, wherein displaying the event action on the user device for the defined time interval includes displaying the event action on at least one of a smart phone, tablet, laptop, and interactive TV for a number of seconds during the live event.

39. The method of claim 23, wherein receiving real-time data of the at least one live event includes receiving play-by-play data such as at least one of a strikeout, foul ball, home run, goal, single, and double.

40. The method of claim 23, wherein receiving real-time data of the at least one live event includes receiving real-time data of a live: sporting event, concert, awards ceremony, news program, political event, or the like.

* * * * *